United States Patent
Imai et al.

(10) Patent No.: US 8,325,238 B2
(45) Date of Patent: Dec. 4, 2012

(54) TEST PATTERN SIGNAL GENERATOR AND GENERATION METHOD, COLOR MEASUREMENT SYSTEM AND DISPLAY DEVICE

(75) Inventors: Yutaka Imai, Tokyo (JP); Naoya Katoh, Chiba (JP)

(73) Assignee: Sony Corporation (JP)

( * ) Notice: Subject to any disclaimer, the term of this patent is extended or adjusted under 35 U.S.C. 154(b) by 1075 days.

(21) Appl. No.: 12/156,185

(22) Filed: May 30, 2008

(65) Prior Publication Data
US 2008/0297604 A1 Dec. 4, 2008

(30) Foreign Application Priority Data
Jun. 4, 2007 (JP) ................ P2007-148646

(51) Int. Cl.
*H04N 17/00* (2006.01)
(52) U.S. Cl. ........................ 348/181; 348/254
(58) Field of Classification Search ............... 348/181, 348/254
See application file for complete search history.

(56) References Cited

U.S. PATENT DOCUMENTS

| | | | |
|---|---|---|---|
| 2002/0063801 A1 | 5/2002 | Richardson | |
| 2004/0001072 A1 | 1/2004 | Newman | |
| 2007/0052735 A1* | 3/2007 | Chou | 345/690 |
| 2007/0132866 A1* | 6/2007 | Lee et al. | 348/254 |
| 2007/0171289 A1 | 7/2007 | Ishimoto et al. | |

FOREIGN PATENT DOCUMENTS

| | | |
|---|---|---|
| EP | 1385340 A2 | 1/2004 |
| JP | 2006-033575 A | 2/2006 |

OTHER PUBLICATIONS

European Search Report EP 08157464, dated Jan. 11, 2011.
Ken Rockwell: "sRGB vs. Adobe RGB". www.kenrockwell.com 2006, XP 002615028.
IEC TC 100 Via SC 29 Secretariat: "IEC CDV 61966-2-4 [SC 29 N 6741]", ITU Study Group 16—Video Coding Experts Group—ISO/IEC MPEG & ITU- T VCEG (ISO/IEC JTC1/SC29/WG11 and ITU-T SG16 Q6), XX, XX, No. M12153, May 20, 2005 XP 030040856.

* cited by examiner

*Primary Examiner* — Nasser Goodarzi
*Assistant Examiner* — Jivka Rabovianski
(74) *Attorney, Agent, or Firm* — Lerner, David, Littenberg, Krumholz & Mentlik, LLP (57) ABSTRACT

Disclosed herein is a test pattern signal generator for outputting a video signal adapted to display, on a display device, a test pattern of a color chart according to a standard for a first color gamut and a color chart of a test pattern according to a standard for a second color gamut which is wider than the first color gamut, the test pattern signal generator including: a color chart recording section configured to record color chart information of the standard for the first color gamut and color chart information of the standard for the second color gamut; and a test pattern signal generation section configured to generate, based on the information recorded in the color chart recording section, a video signal adapted to display test patterns in which the color charts according to the respective standards are arranged in a predetermined layout on the same screen.

9 Claims, 8 Drawing Sheets

50

| | (+) 51 | | | 53 | | | (-) 52 | | | |
|---|---|---|---|---|---|---|---|---|---|---|
| | R+ | G+ | B+ | R | G | B | R- | G- | B- | |
| Wh | 1+K | 1+K | 1+K | 1 | 1 | 1 | 1-L | 1-L | 1-L | Wh |
| Yl | 1+K | 1+K | 0 | 1 | 1 | 0 | 1 | 1 | -L | Yl |
| Cy | 0 | 1+K | 1+K | 0 | 1 | 1 | -L | 1 | 1 | Cy |
| Gr | 0 | 1+K | 0 | 0 | 1 | 0 | -L | 1 | -L | Gr |
| Mg | 1+K | 0 | 1+K | 1 | 0 | 1 | 1 | -L | 1 | Mg |
| Rd | 1+K | 0 | 0 | 1 | 0 | 0 | 1 | -L | -L | Rd |
| Bl | 0 | 0 | 1+K | 0 | 0 | 1 | -L | -L | 1 | Bl |
| BK | 0+K | 0+K | 0+K | 0 | 0 | 0 | 0-L | 0-L | 0-L | BK |

K:1ST FACTOR
L:2ND FACTOR

| | (+) 51 | | | 53 | | | (−) 52 | | | |
|---|---|---|---|---|---|---|---|---|---|---|
| | R+ | G+ | B+ | R | G | B | R− | G− | B− | |
| Wh | 1+K | 1+K | 1+K | 1 | 1 | 1 | 1−L | 1−L | 1−L | Wh |
| Yl | 1+K | 1+K | 0 | 1 | 1 | 0 | 1 | 1 | −L | Yl |
| Cy | 0 | 1+K | 1+K | 0 | 1 | 1 | −L | 1 | 1 | Cy |
| Gr | 0 | 1+K | 0 | 0 | 1 | 0 | −L | 1 | −L | Gr |
| Mg | 1+K | 0 | 1+K | 1 | 0 | 1 | 1 | −L | 1 | Mg |
| Rd | 1+K | 0 | 0 | 1 | 0 | 0 | 1 | −L | −L | Rd |
| Bl | 0 | 0 | 1+K | 0 | 0 | 1 | −L | −L | 1 | Bl |
| BK | 0+K | 0+K | 0+K | 0 | 0 | 0 | 0−L | 0−L | 0−L | BK |

K:1ST FACTOR
L:2ND FACTOR

| 61wh | 61yl | 61cy | 61gr | 61mg | 61rd | 61bl | 61bk |
|---|---|---|---|---|---|---|---|
| WHITE IN xvYCC POS. WIDE COLOR GAMUT | YELLOW IN xvYCC POS. WIDE COLOR GAMUT | CYAN IN xvYCC POS. WIDE COLOR GAMUT | GREEN IN xvYCC POS. WIDE COLOR GAMUT | MAGENTA IN xvYCC POS. WIDE COLOR GAMUT | RED IN xvYCC POS. WIDE COLOR GAMUT | BLUE IN xvYCC POS. WIDE COLOR GAMUT | BLACK IN xvYCC POS. WIDE COLOR GAMUT |

71 — 62wh, 62yl, 62cy, 62gr, 62mg, 62rd, 62bl, 62bk

| sRGB'S WHITE | sRGB'S YELLOW | sRGB'S CYAN | sRGB'S GREEN | sRGB'S MAGENTA | sRGB'S RED | sRGB'S BLUE | sRGB'S BLACK |
|---|---|---|---|---|---|---|---|

72 — 73

| WHITE IN xvYCC NEG. WIDE COLOR GAMUT | YELLOW IN xvYCC NEG. WIDE COLOR GAMUT | CYAN IN xvYCC NEG. WIDE COLOR GAMUT | GREEN IN xvYCC NEG. WIDE COLOR GAMUT | MAGENTA IN xvYCC NEG. WIDE COLOR GAMUT | RED IN xvYCC NEG. WIDE COLOR GAMUT | BLUE IN xvYCC NEG. WIDE COLOR GAMUT | BLACK IN xvYCC NEG. WIDE COLOR GAMUT |
|---|---|---|---|---|---|---|---|
| 63wh | 63yl | 63cy | 63gr | 63mg | 63rd | 63bl | 63bk |

DISPLAYABLE COLOR RANGE OF DISPLAY,
VISIBLE RANGE AND sRGB COLOR GAMUT

FIG.10

TEST PATTERN SIGNAL GENERATOR AND GENERATION METHOD, COLOR MEASUREMENT SYSTEM AND DISPLAY DEVICE

CROSS-REFERENCE TO RELATED APPLICATIONS

The present application claims priority from Japanese Patent Application No. JP 2007-148646, filed in the Japanese Patent Office on Jun. 4, 2007, the entire content of which is incorporated herein by reference.

BACKGROUND OF THE INVENTION

1. Field of the Invention

The present invention relates to a test pattern signal generator and generation method, color measurement system and display device suitable for testing the display of colors represented, for example, by the xvYCC color gamut.

2. Description of the Related Art

Today, some among existing display devices designed to receive and display video data offer improved color representation capability. That is, the color representation capability of video data handled by existing display devices basically assumes the use of a CRT (Cathode Ray Tube) as display means. A color range representable by primary color data, i.e., R, G and B data, has been set by bearing in mind the color range representable by a CRT.

As for display means incorporating a display device, on the other hand, new types have come along which provide a wider color representation range than a CRT. In the case of a liquid crystal display, for example, the color representation range is determined by the characteristic of the light source used as its backlight. This makes it relatively easier to expand the color representation range than with a CRT.

A standard called "xvYCC" has been developed recently as a standard for video data (moving image data) handled by such display devices with a wider color representation range. By processing video data represented in compliance with "xvYCC," pictures with a wider color representation range can be displayed. It should be noted that RGB data in the existing color representation range will be referred to as the "sRGB signal" in the description given below.

Here, a description will be given of the color range representable by a television set, computer monitor and so on with reference to FIGS. 9 and 10.

Figure 9:
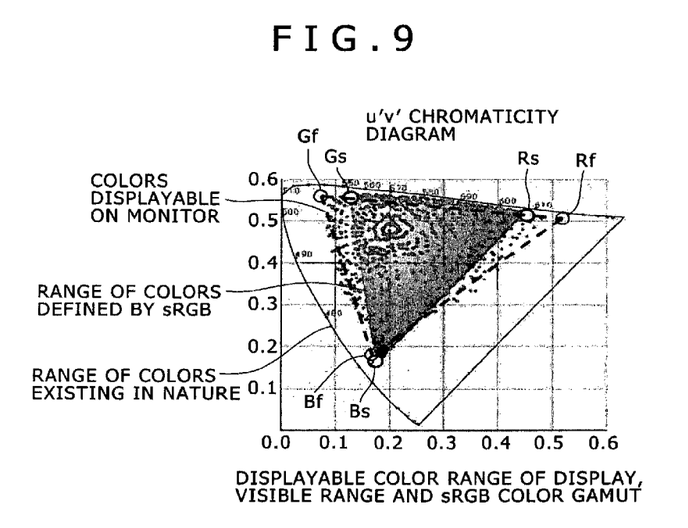
FIG. 9 is an explanatory view illustrating the relationship between the displayable region of a display and the color gamut represented by an sRGB signal.

FIG. 9 is a u'v' chromaticity diagram in which a three-dimensional object (color space) is projected in a display device capable of receiving and displaying RGB data, namely, primary color data. The horizontal axis represents "u'" and the vertical axis "v'." In FIG. 9 illustrated as a u'v' chromaticity diagram, the range of colors typifying Nature is shown as the outer fan shape. In FIG. 9, the triangular area enclosed by three points Rs, Gs and Bs, for example, is the color gamut which can be represented by the RGB data used for the existing video signal. If in analog form, each color inside the triangle can be uniquely determined by assigning a value in the range of 0 to 1 as each of the three primary color values, namely, RGB values. The color gamut which can be displayed is determined by which RGB values are assigned. One among such color gamut standards is the sRGB standard. A value represented in the range of 0 to 1 for an analog signal is given, for example, by a value quantized with eight bits for a digital signal.

Because of the characteristic of phosphors of CRTs used as display means, the vertices (chromaticity points of three primary colors) Rs, Gs and Bs of the sRGB standard as shown in FIG. 9 used to match the three primary color points which can be represented by a television set. However, with an increasing number of non-CRT television sets available today such as FPD (Flat Panel Display) and projection type television sets, the color gamut reproducible by a television set has expanded beyond that defined by the SRGB standard (also referred to as the "normal color gamut"). This has made it possible to reproduce a wider color gamut (also referred to as the "wide color gamut"). An example of a color gamut enclosed within a dashed line by vertices Rf, Gf and Bf in FIG. 9 shows the color gamut which can be displayed when video data is configured as an xvYCC signal. The respective points in FIG. 9 indicate the actual chromaticity levels. As is clear from FIG. 9, there are, in the image, a significant number of colors which lie outside the color gamut representable by an sRGB signal. These colors lie in the color gamut representable by an xvYCC signal.

Figure 10:
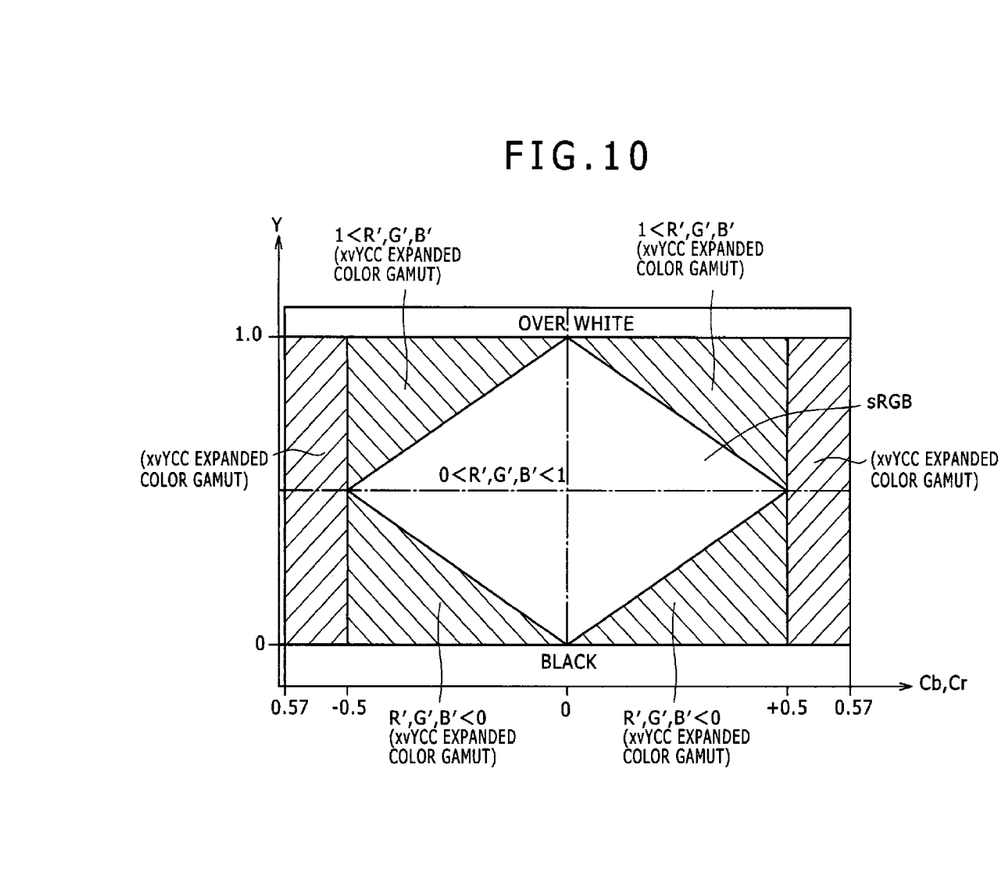
FIG. 10 is an explanatory view illustrating the relationship in color gamut between the sRGB and xvYCC signals.

FIG. 10 is a view illustrating the relationship in color gamut between the xvYCC and sRGB signals. The vertical axis represents a brightness signal Y, and the horizontal axis color difference signals Cb and Cr. According to the xvYCC standard, the xvYCC signal employs the same primary color points as the sRGB signal and represents a color with the brightness signal Y and the two color difference signals Cb and Cr as illustrated in FIG. 10, thus encompassing the sRGB color gamut. As illustrated in the same figure, the sRGB color gamut is shown in the form of a rhombus, with an expanded xvYCC color gamut provided around the rhombus.

Japanese Patent Laid-Open No. 2006-33575 describes a signal processing device capable of providing a signal which can represent colors in a color gamut wider than as defined by a predetermined standard and which can be handled by a device compliant with a predetermined standard.

SUMMARY OF THE INVENTION

Incidentally, it has been difficult to determine whether a television set properly displays the color gamut represented by an xvYCC signal. For example, the colors to be tested have to be displayed one at a time because the color gamut displayable on a television set was monochrome.

The present invention has been accomplished in light of the foregoing, and it is desirable to display test patterns covering a wide color gamut on a display device.

The present invention is applied when two test patterns are displayed on a display device. One of the test patterns is that of a color chart according to a standard for a first color gamut. Another test pattern is that of a color chart according to a standard for a second color gamut which is wider than the first color gamut. For this reason, color chart information of the standards for the first and second color gamuts is recorded. Then, a video signal is generated which displays, based on the recorded color chart information, test patterns on the same screen. In the test patterns, the color charts according to the respective standards are arranged in a predetermined layout. The color charts are displayed using this video signal.

This has made it possible to display not only a test pattern covering color signals in a normal color gamut but also another pattern covering color signals in a wide color gamut.

The present invention provides an advantage in that it can be determined whether a display panel of a television set or other equipment delivers wide color gamuts using test patterns displayed on the display panel.

DETAILED DESCRIPTION OF THE PREFERRED EMBODIMENT

An embodiment of the present invention will be described below with reference to FIGS. 1 to 7.

Figure 1:
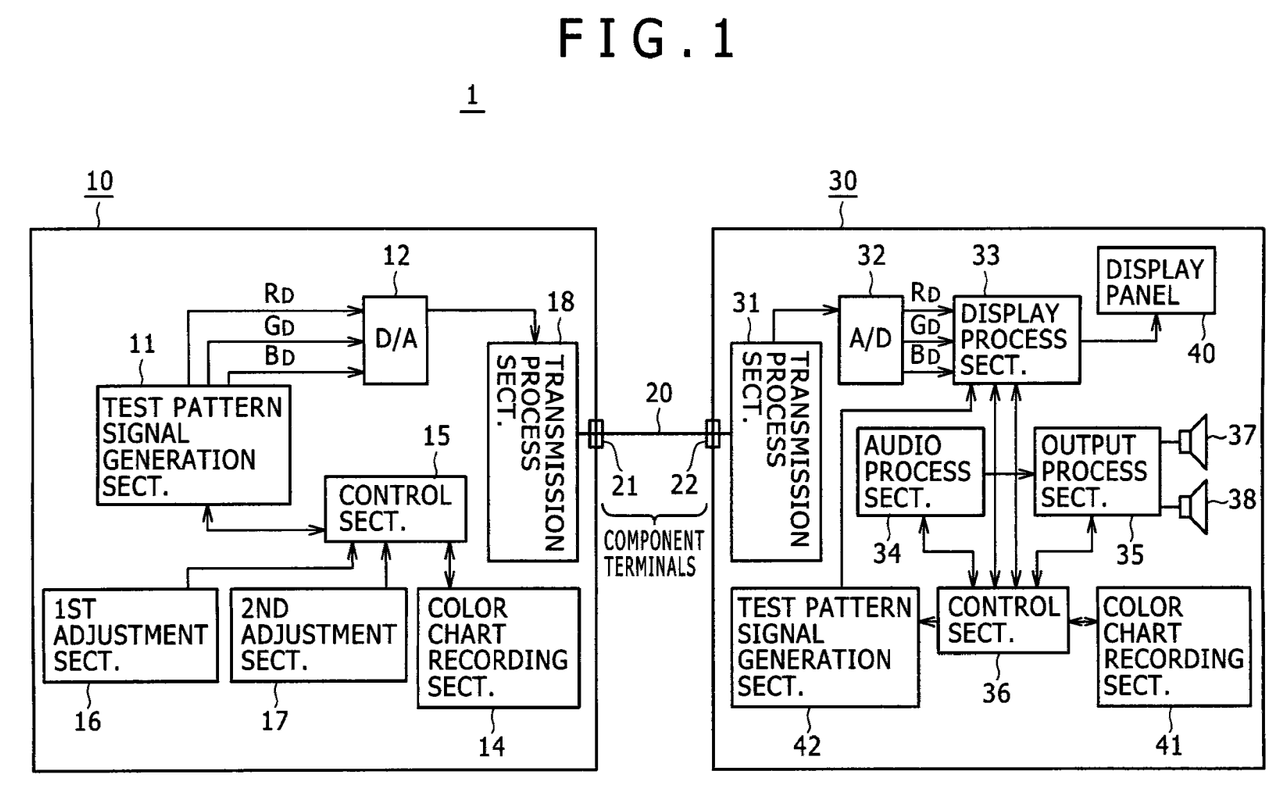
FIG. 1 is a block diagram illustrating a configuration example of a test pattern signal generator and television set according to an embodiment of the present invention.

FIG. 1 is a view illustrating an example of system configuration of the present invention. The system according to the present embodiment is configured as a test pattern display system 1. The same system 1 displays test patterns on a television set 30 which serves as a display device. The same system 1 includes a test pattern signal generator 10 serving as a source device and the television set 30 serving as a sink device. The test pattern signal generator 10 and television set 30 are connected together by a component cable 20. The same generator 10 transmits a test pattern signal and test video data, generated based on a color chart, to the television set 30. The same generator 10 according to the present embodiment can generate a test pattern signal with the normal and wide color gamuts. The television set 30 can display pictures offering the wide color gamut.

In the present embodiment, primary color data, i.e., R, G and B data, is transmitted in an as-is manner via the component cable 20 using its transmission scheme. On the other hand, a signal with the normal color gamut is referred to as the sRGB signal, and a signal with the wide color gamut the xvYCC signal. The color gamut represented by the sRGB signal has been defined by standards including the existing video signal standards. The xvYCC signal has been defined as a standard to deliver a color gamut wider than the above. If each piece of R, G and B data of the sRGB signal has a value in the range from 0 to 1 to represent each color, each piece of R, G and B data of the xvYCC signal may have a negative value smaller than 0 or a value greater than 1. These negative value smaller than 0 and value greater than 1 constitute those values falling within the color gamut which may not be represented by the existing sRGB signal.

The test pattern signal generator 10 will be described first.

The same generator 10 can generate, based on a color chart which will be described later, a test pattern signal to be displayed on the television set 30. An xvYCC evaluation chart 50, which will be described later, is recorded in a color chart recording section 14. The same section 14 is, for example, a built-in hard disk drive. A control section 15 adapted to control various other sections reads a color chart from the color chart recording section 14 and supplies the chart to a test pattern signal generation section 11. The same generator 10 includes first and second adjustment sections 16 and 17. The first adjustment section 16 can adjust a normal color gamut parameter to cover a positive wide color gamut by adding a predetermined factor to the parameter. The second adjustment section 17 can adjust a normal color gamut parameter to cover a negative wide color gamut by subtracting a predetermined factor from the parameter. The first and second adjustment sections 16 and 17 can adjust parameters of the color chart recorded in the color chart recording section 14 via the control section 15. The test pattern signal generation section 11 generates a test pattern signal which includes a plurality of types of color signals. If the test pattern signal is in digital form, the same section 11 supplies the signal to a digital/analog conversion circuit 12 for conversion into analog form for transmission.

RGB data converted into analog form for each color by the digital/analog conversion circuit 12 or RGB data supplied in analog form from the test pattern signal generation section 11 is supplied to a transmission process section 18. The same section 18 assigns pixel data for each color to a separate channel. Further, the same section 18 assigns a pixel clock and control data to appropriate channels. The same section 18 transmits the data to the component cable 20 connected to a component terminal 21.

The component cable 20 is connected to a component terminal 22 of the television set 30.

The configuration of the television set 30 will be described next.

The data transmitted via the component cable 20 which is connected to the component terminal 22 of the television set 30 is detected (received) by a transmission process section 31 in synchronism with the pixel clock. The data detected for each channel is added, at the instruction of a control section 36 of the television set 30, with video data within and outside the color gamut of the SRGB signal to produce one piece of video signal per pixel for each color. Then, the video data resulting from the addition is supplied to the as analog/digital conversion circuit 32 to produce separate pieces of digital video data RD, GD and BD per pixel for the respective colors. The converted pieces of digital video data RD, GD and BD are supplied to a display process section 33. The same section 33 drives a display panel 40 serving as a display section.

Further, the television set 30 includes a color chart recording section 41 and test pattern signal generation section 42. The color chart recording section 41 records the same color chart as recorded in the test pattern signal generator 10. The test pattern signal generation section 42 generates a test pattern signal based on the color chart read from the color chart recording section 41. Such a configuration allows to test the display of colors only by means of the television set 30 using test patterns.

The test pattern signal generator 10 according to the present embodiment does not supply audio data to the television set 30. However, if supplied, audio data is separated by the transmission process section 31 first and then undergoes an audio process by an audio process section 34 such as analog/digital conversion. The processed audio output is supplied to an output process section 35, for example, for amplification to drive speakers 37 and 38 and then output from these speakers.

An example of an xvYCC evaluation chart will be described next with reference to FIG. 2.

Figure 2:
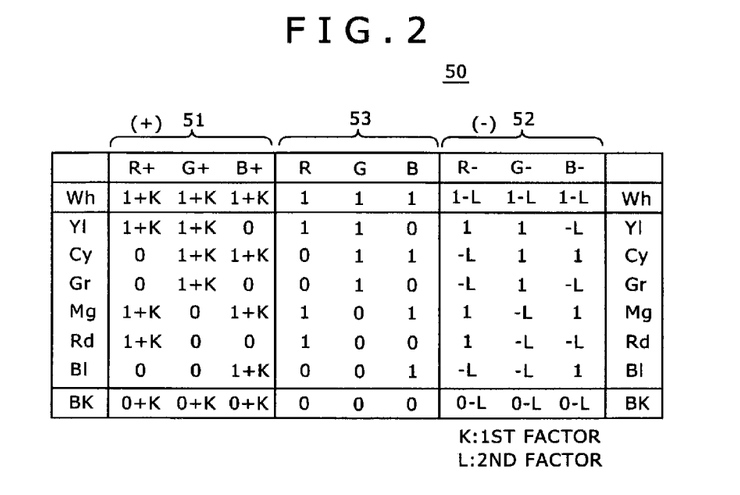
FIG. 2 is an explanatory view illustrating an example of an xvYCC evaluation chart according to the embodiment of the present invention.

An xvYCC evaluation chart 50 shown in FIG. 2 is a color chart referenced by the test pattern signal generation section 11 to generate test patterns from the sRGB signal serving as an existing color signal and the xvYCC signal in the positive and negative wide color gamuts.

Here, the color gamut with an R, G or B value equal to or greater than 1 is referred to as the "positive wide color gamut," and the color gamut with an R, G or B value equal to or smaller than 0 as the "negative wide color gamut."

The xvYCC evaluation chart 50 includes a first color mixture parameter region 51 which defines color mixture parameters for different colors for the xvYCC signal in the positive wide color gamut. The same region 51 defines colors to be displayed on the display panel 40 of the television set 30 for each of the R, G and B signals. To display a certain color with high saturation, however, a first factor K is added to those, among color mixture parameters defined by a normal color gamut color mixture parameter region 53, which are greater than 0. To output yellow in the wide color gamut to the display panel 40, for example, the mixing ratio of the RGB signals (R signal: G signal: B signal) is shown to be (1+K:1+K:0).

The xvYCC evaluation chart 50 further includes the normal color gamut color mixture parameter region 53 which defines color mixture parameters for different colors for the sRGB signal in the normal color gamut. The same region 53 defines colors to be displayed on the display panel 40 of the television set 30 for each of the R, G and B signals. To output yellow in the normal color gamut to the display panel 40, for example, the mixing ratio of the RGB signals (R signal: G signal: B signal) is shown to be (1:1:0).

The xvYCC evaluation chart 50 still further includes a second color mixture parameter region 52 which defines color mixture parameters for different colors for the xvYCC signal in the negative wide color gamut. The same region 52 also defines colors to be displayed on the display panel 40 of the television set 30 for each of the R, G and B signals. To display a certain color with high saturation, however, a second factor L is subtracted from those, among color mixture parameters defined by the normal color gamut color mixture parameter region 53, which are equal to 0. To output yellow in the wide color gamut to the display panel 40, for example, the mixing ratio of the RGB signals (R signal: G signal: B signal) is shown to be (1:1:−L).

Figure 3:
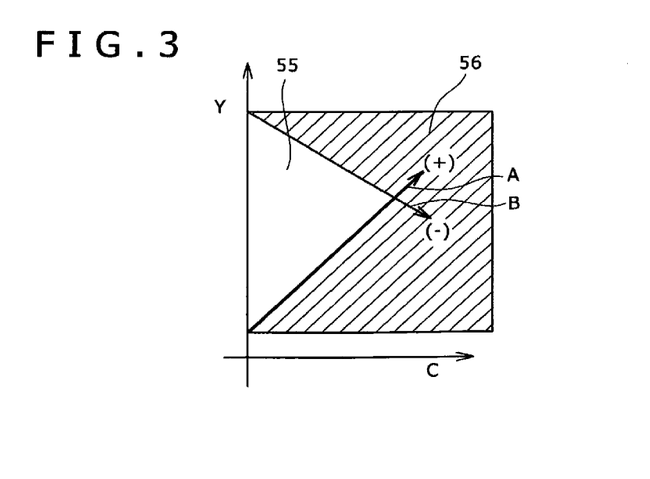
FIG. 3 is an explanatory view illustrating an example of a color representation range for existing and wide color gamuts determined by the xvYCC evaluation chart according to the embodiment of the present invention.

Here, a description will be given of an example of a color representation range for the existing and wide color gamuts determined by the xvYCC evaluation chart 50 with reference to FIG. 3. FIG. 3 is a schematic diagram showing that a color representable by the existing color gamut can represent a color in the wide color gamut by increasing its saturation.

The direction of an arrow A (+) means that a color in the positive wide color gamut having higher saturation than in the existing color gamut is represented by adding the first factor K to a color mixture parameter in the normal color gamut so that one of the R, G and B values is 1 or greater.

The direction of an arrow B (−) means that a color in the negative wide color gamut having higher saturation than in the existing color gamut is represented by subtracting the second factor L from a color mixture parameter in the normal color gamut so that one of the R, G and B values is 0 or smaller.

As described above, the color mixture parameters defined by the xvYCC evaluation chart 50 allow for representation of the colors which fall within the positive and negative wide color gamuts.

As illustrated in FIGS. 2 and 3, the first color mixture parameter region 51 in the xvYCC evaluation chart 50 defines color mixture parameters for which the first factor K is added to the mixing ratio of the RGB signals if the ratio is greater than 0 in the normal color gamut color mixture parameter region 53. Similarly, the second color mixture parameter region 52 defines color mixture parameters for which the second factor L is subtracted from 0 if the mixing ratio of the RGB signals is equal to 0 in the normal color gamut color mixture parameter region 53.

A description will be given next of an example of test patterns displayed on the display panel 40 with reference to FIG. 4.

Figure 4:
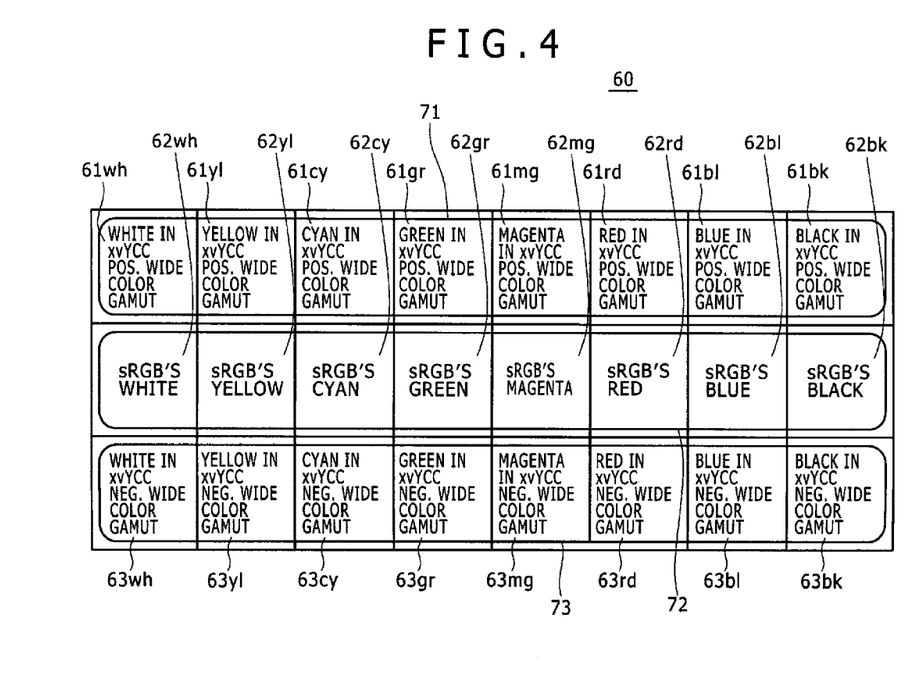
FIG. 4 is an explanatory view illustrating an example of test patterns displayed on a television set based on the xvYCC evaluation chart according to the embodiment of the present invention.

Test patterns 60 shown in FIG. 4 display eight colors, i.e., white, yellow, cyan, green, magenta, red, blue and black, horizontally using a test pattern signal generated from the xvYCC evaluation chart 50. Twenty four (24) rectangular regions in three rows by eight columns are displayed in a matrix manner over the entire screen of the display panel 40.

Eight regions display the positive wide color gamut using the xvYCC signal. These regions are a region 61*wh* adapted to display white, region 61*yl* adapted to display yellow, region 61*cy* adapted to display cyan, region 61*gr* adapted to display green, region 61*mg* adapted to display magenta, region 61*rd* adapted to display red, region 61*bl* adapted to display blue and region 61*bk* adapted to display black. These regions are referred to as first band regions 71.

Another eight regions display the normal color gamut using the sRGB signal. These regions are a region 62*wh* adapted to display white, region 62*yl* adapted to display yellow, region 62*cy* adapted to display cyan, region 62*gr* adapted to display green, region 62*mg* adapted to display magenta, region 62*rd* adapted to display red, region 62*bl* adapted to display blue and region 62*bk* adapted to display black. These regions are referred to as second band regions 72.

Yet another eight regions display the negative wide color gamut using the xvYCC signal. These regions are a region 63*wh* adapted to display white, region 63*yl* adapted to display yellow, region 63*cy* adapted to display cyan, region 63*gr* adapted to display green, region 63*mg* adapted to display magenta, region 63*rd* adapted to display red, region 63*bl* adapted to display blue and region 63*bk* adapted to display black. These regions are referred to as third band regions 73.

For the first band regions 71, the first adjustment section 16 adjusts the first factor K to adjust the saturation to such an extent that the difference in saturation is no longer perceivable by humans. This makes it possible to recognize the saturation limit in the positive wide color gamut.

For the third band regions 73, the second adjustment section 17 adjusts the second factor L to adjust the saturation to such an extent that the difference in saturation is no longer perceivable by humans. This makes it possible to recognize the saturation limit in the negative wide color gamut.

A description will be given next of an example of test patterns displayed on a television set not supporting xvYCC with reference to FIG. 5. The combination of test pattern regions shown in FIGS. 5 to 7 is the same as that of test pattern regions shown in FIG. 4.

Figure 5:
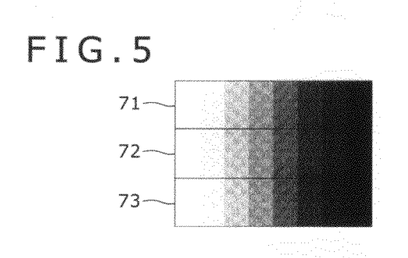
FIG. 5 is an explanatory view illustrating an example of test patterns displayed on a television set not supporting xvYCC.

The television set shown in FIG. 5 which does not support xvYCC may not display the positive or negative wide color gamut. Therefore, this television set displays the first band regions 71 associated with the positive wide color gamut and the third band regions 73 associated with the negative wide color gamut together with the second band regions 72 with the same saturation in the column direction.

A description will be given next of examples of test patterns displayed on a television set supporting xvYCC with reference to FIGS. 6A to 6C.

Figure 6A:
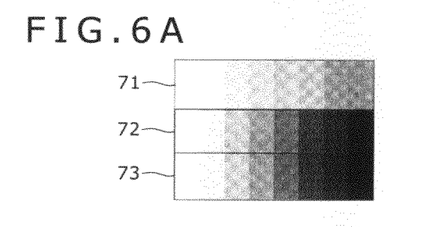
FIGS. 6A to 6C are explanatory views illustrating examples of test patterns displayed on a television set supporting xvYCC.
Figure 6B:
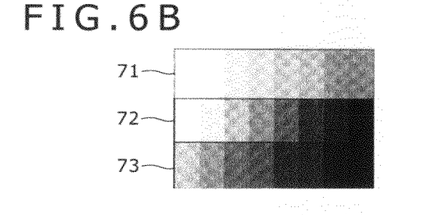
Figure 6C:
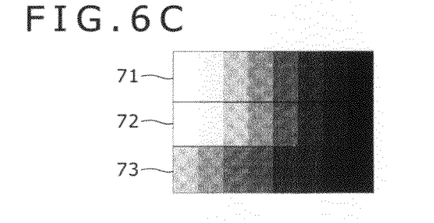
Figure 7A:
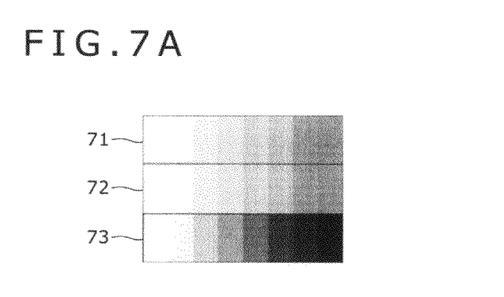
FIGS. 7A and 7B are explanatory views illustrating examples of test patterns displayed on a television set when band regions are fixed in the normal color gamut.
Figure 7B:
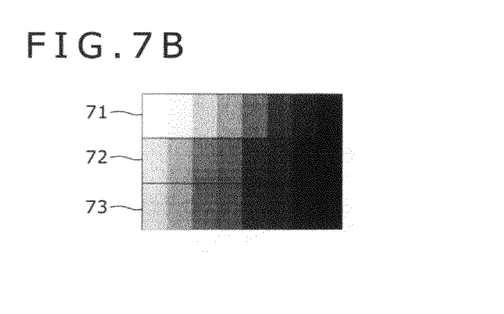

FIG. 6A illustrates an example of test patterns displayed on a television set supporting only the xvYCC signal in the positive wide color gamut. In this case, the first band regions 71 are displayed with higher saturation than the second band regions 72. The second and third band regions 72 and 73 are displayed with the same saturation.

FIG. 6B illustrates an example of test patterns displayed on a television set supporting the xvYCC signal in the positive and negative wide color gamuts. In this case, the first and third band regions 71 and 73 are displayed with higher saturation than the second band regions 72.

FIG. 6C illustrates an example of test patterns displayed on a television set supporting only the xvYCC signal in the negative wide color gamut. In this case, the third band regions 73 are displayed with higher saturation than the second band regions 72. The first and second band regions 71 and 72 are displayed with the same saturation.

A description will be given next of examples of test patterns displayed on a television set when the band regions are fixed in the normal color gamut.

FIG. 7A illustrates an example of test patterns displayed on a television set supporting the xvYCC signal in the positive wide color gamut when the third band regions 73 are fixed in the normal color gamut. In this case, the first and second band regions 71 and 72 are displayed with higher saturation than the third band regions 73.

FIG. 7B illustrates an example of test patterns displayed on a television set supporting the xvYCC signal in the negative wide color gamut when the first band regions 71 are fixed in the normal color gamut. In this case, the second and third band regions 72 and 73 are displayed with higher saturation than the first band regions 71.

The test pattern signal generator 10 described above according to the present embodiment can supply a test pattern signal to the television set 30 based on a color chart. The test pattern signal includes information of the color signal which falls within the positive and negative wide color gamuts. The television set 30 can display test patterns on the display panel 40 based on the supplied test patterns. As a result, the present invention provides an advantage in that it can be readily determined with a displayed test pattern whether the television set 30 delivers wide color gamuts in its image processing by arranging the positive and negative wide color gamuts together with the normal color gamut.

The display panel 40 displays test patterns in a matrix manner for each color. This is advantageous in that the color difference is obvious between the adjacent regions.

A test pattern signal associated with the positive wide color gamut is supplied to the television set 30 to display colors in the positive wide color gamut on the display panel 40. This is advantageous in that a test can be performed to reproduce colors with higher saturation in the wide color gamut.

A test pattern signal associated with the negative wide color gamut is supplied to the television set 30 to display colors in the negative wide color gamut on the display panel 40. This is advantageous in that a test can be performed to reproduce colors with higher saturation in the wide color gamut.

The colors in the normal color gamut and in the positive and negative color gamuts can be displayed together over the entire screen of the display panel 40. This makes it possible to test the display of colors in the normal color gamut and in the positive and negative wide color gamuts at the same time. This is advantageous in that the test time can be reduced.

A predetermined factor is added to or subtracted from a color mixture parameter in the normal color gamut to generate a test pattern signal covering the positive and negative wide color gamuts. This adjustment of the factor can be accomplished by the first and second adjustment sections. As a result, a test pattern signal can be readily generated with simple operation. This is advantageous in that the processing load of the device can be reduced.

Here, a description will be given of another embodiment of the present invention with reference to FIG. 8.

Figure 8:
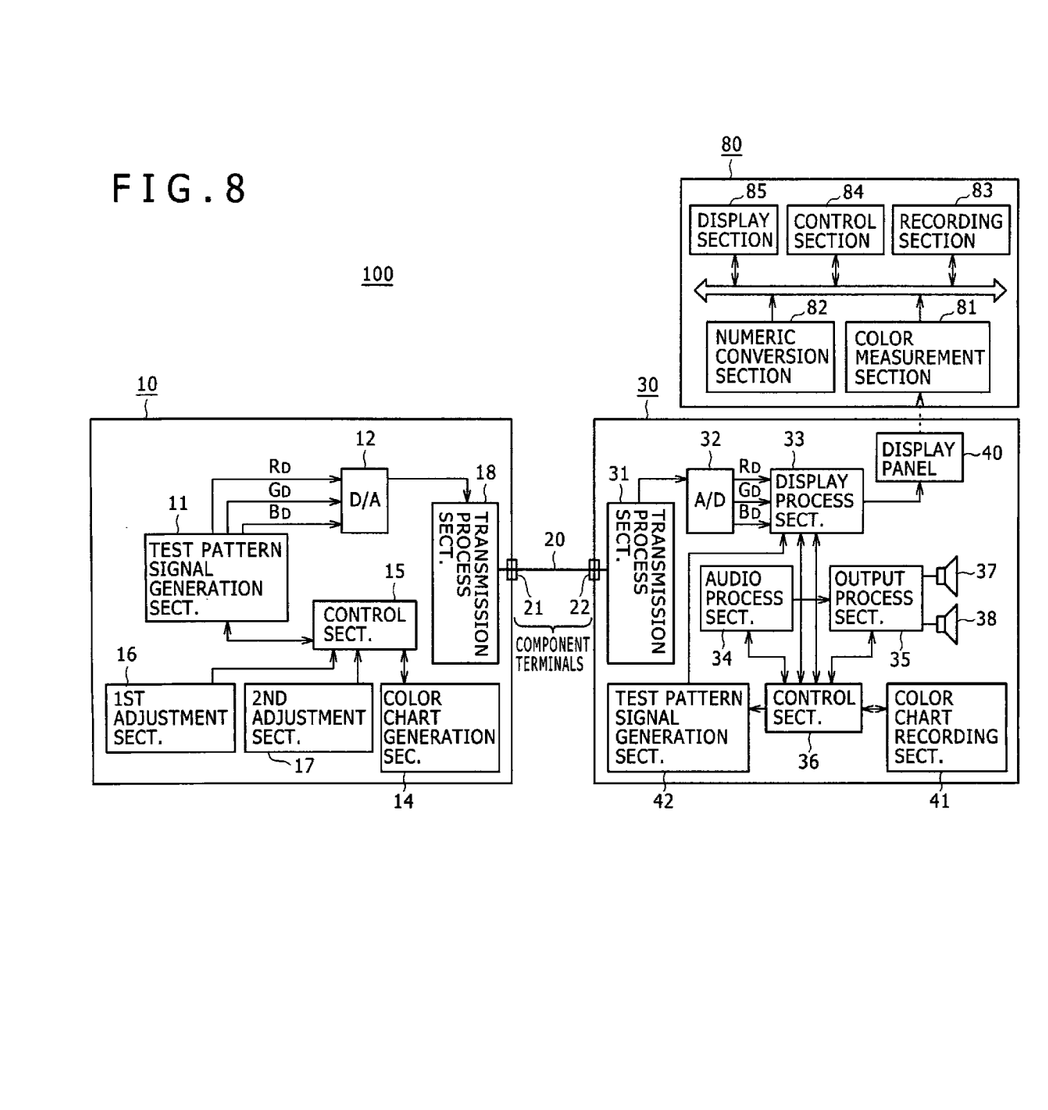
FIG. 8 is a block diagram illustrating a configuration example of a color measurement system according to another embodiment of the present invention.

FIG. 8 illustrates a configuration example of a color measurement system 100 incorporating a color measurement device 80. The same device 80 is capable of measuring test patterns displayed on the display panel 40 shown in FIG. 1 and organizing the measured data into a graph. It should be noted that in FIG. 8 like components as those in FIG. 1 are denoted by the same reference numerals.

The color measurement device 80 includes a color measurement section 81, numeric conversion section 82, recording section 83, control section 84 and display section 85. The color measurement section 81 measures the colors of the test patterns displayed on the display panel 40. The numeric conversion section 82 converts color measurement data into predetermined numeric data and analyzes the same data. The recording section 83 records the converted numeric data. The control section 84 controls the respective sections of the color measurement device 80. The display section 85 receives color measurement data and displays a graph or measured values.

A spectrometer is used as the color measurement section 81. The spectrometer separately measures the colors in the respective regions of the test patterns displayed on the display panel 40. Alternatively, however, an image of the entire screen of the display panel 40 may be captured with a CCD (Charge-Coupled Devices) imager, CMOS (Complementary Metal Oxide Semiconductor) imager or other imaging device as an image pickup element to load the captured image data.

The numeric conversion section 82 converts analog color data measured by the measurement section 81 into digital data, records the digital data in a format that can be displayed in a graph form and displays a graph on the display section 85. The graph displayed at this time is, for example, a line graph. It should be noted that the color measurement data may be displayed as-is in numeric form. In this case, the u' and v' values for a certain measured color are, for example, shown respectively as "(0.2, 0.4)" in an enumerated manner. The u' and v' values are shown relative to the coordinates determined by the u'v' chromaticity diagram.

The recording section 83 includes a readable/writable recording medium such as hard disk drive.

The color measurement device 80 as described above ensures efficiency in testing the display of colors on the display panel 40. This is advantageous in that the display of colors can be tested under the same conditions even in the presence of the plurality of television sets 30.

It should be noted that although the sRGB signal was used as a color signal in the normal color gamut represented by a test pattern, a color signal according to other scheme may also be used.

The order of arrangement of the first to third band regions 71 to 73 may be changed according to the details of the display color test. Two of the first to third band regions 71 to 73 may be chosen for use as test patterns. The types of colors displayed on the display panel 40 as test patterns are not limited to eight, and may be changed according to the details of the display color test.

Although recorded in the color chart recording section 14 of the test pattern signal generator in the above embodiments, the color chart may be recorded in an external recording device or received via a communication circuit. This arrangement makes it possible to flexibly change the color chart according to the details of the display color test, thus allowing to change the test patterns to be displayed on the display panel 40.

Although displayed over the entire screen of the display panel 40 in the above embodiments, the color chart may be displayed only on part of the screen. Although displayed in a matrix manner to include a plurality of color regions in the above embodiments, the color chart may be displayed in a gradated manner in the positions appropriate for the first to third band regions 71 to 73 so that the color reproducibility can be visually inspected by humans.

The color measurement results by the color measurement device 80 may be fed back to the test pattern signal generator 10. The test patterns may be dynamically changed through this feedback control. Alternatively, the test pattern signal generator 10 may record the display results that have been fed back.

To define the color mixture parameters in the positive and negative wide color gamuts by the xvYCC evaluation chart 50 in the above embodiments, the first factor K is added to those, among the color mixture parameters in the normal color gamut, which are greater than 0, and the second factor L is subtracted from those, among color mixture parameters in the normal color gamut, which are equal to 0. However, the color mixture parameters in the normal color gamut may be multiplied or divided by each of the factors to define the color mixture parameters in the positive and negative wide color gamuts. Addition of the first factor K and subtraction of the second factor L may be performed at the same time to define the color mixture parameters in the positive and negative wide color gamuts. For example, the mixing ratio of (R signal: G signal: B signal) can be (1+K:−L:−L) to define the color mixture parameters in the wide red gamut.

The test pattern signal generator 10 generates test patterns based on the xvYCC evaluation chart 50 in the above embodiments. However, a JPEG (Joint Photographic Experts Group) file or other still image file or an MPEG (Moving Picture Experts Group) or other moving image file, in which test patterns are recorded, may be supplied to the television set 30.

It should be understood by those skilled in the art that various modifications, combinations, sub-combinations and alterations may occur depending on design requirements and other factor in so far as they are within the scope of the appended claims or the equivalents thereof.

What is claimed is:

1. A test pattern signal generator for outputting a video signal adapted to display, on a display device, a test pattern of a color chart, the test pattern signal generator comprising:
   a color chart recording section configured to record color chart information of a standard for a first color gamut and color chart information of a standard for a second color gamut; and
   a test pattern signal generation section configured to generate, based on the information recorded in the color chart recording section, a video signal adapted to display test patterns in which the color charts according to the respective standards are arranged in a predetermined layout on a same screen of the display device,
   the standard for the first color gamut is a sRGB standard and the standard for the second color gamut is a xvYCC standard, in which a color chart of a test pattern for the xvYCC standard has a wider color range than that of the sRGB standard, and
   the test patterns are displayed in a matrix manner for each color on the same screen of the display device and include first, second and third regions, in which a color chart associated with the sRGB standard is displayed in the first region, a color chart associated with the xvYCC standard which is expanded in the positive direction of the sRGB standard is displayed in the second region, and a color chart associated with the xvYCC standard which is expanded in the negative direction of the sRGB standard is displayed in the third region.

2. The test pattern signal generator of claim 1 comprising:
   a first adjustment section configured to adjust the extent to which the colors of the color chart displayed in the second region are expanded in the positive direction of the first color gamut; and
   a second adjustment section configured to adjust the extent to which the colors of the color chart displayed in the second region are expanded in the negative direction of the first color gamut.

3. A test pattern signal generation method for outputting a video signal adapted to display, on a display device, a test pattern of a color chart, the test pattern signal generation method comprising:
   recording color chart information of a standard for a first color gamut and color chart information of a standard for a second color gamut; and
   generating, based on the color chart information, a video signal adapted to display test patterns in which the color charts according to the respective standards are arranged in a predetermined layout on a same screen of the display device,
   the standard for the first color gamut is a sRGB standard and the standard for the second color gamut is a xvYCC standard, in which a color chart of a test pattern for the xvYCC standard has a wider color range than that of the sRGB standard, and
   the test patterns are displayed in a matrix manner for each color on the same screen of the display device and include first, second and third regions, in which a color chart associated with the sRGB standard is displayed in the first region, a color chart associated with the xvYCC standard which is expanded in the positive direction of the sRGB standard is displayed in the second region, and a color chart associated with the xvYCC standard which is expanded in the negative direction of the sRGB standard is displayed in the third region.

4. A color measurement system for generating a video signal adapted to display a test pattern of a color chart, displaying the generated video signal on a display device, and measuring displayed colors, the color measurement system comprising:
   a color chart recording section configured to record color chart information of a standard for a first color gamut and color chart information of a standard for a second color gamut;
   a test pattern signal generation section configured to generate, based on the information recorded in the color chart recording section, a video signal adapted to display test patterns in which the color charts according to the respective standards are arranged in a predetermined layout on a same screen of the display device; and
   a color measurement section configured to measure a measurement data of a test pattern displayed on the display device based on the video signal generated by the test pattern signal generation section;

a numeric conversion section configured to convert color measurement data into numeric data and analyze the numeric data, the standard for the first color gamut is a sRGB standard and the standard for the second color gamut is a xvYCC standard, in which a color chart of a test pattern for the xvYCC standard has a wider color range than that of the sRGB standard, and the test patterns are displayed in a matrix manner for each color on the same screen of the display device and include first, second and third regions, in which a color chart associated with the sRGB standard is displayed in the first region, a color chart associated with the xvYCC standard which is expanded in the positive direction of the sRGB standard is displayed in the second region, and a color chart associated with the xvYCC standard which is expanded in the negative direction of the sRGB standard is displayed in the third region.

5. A display device for displaying a test pattern of a color chart, the display device comprising:

a color chart recording section configured to record color chart information of a standard for a first color gamut and color chart information of a standard for a second color gamut;

a test pattern signal generation section configured to generate, based on the information recorded in the color chart recording section, a video signal adapted to display test patterns in which the color charts according to the respective standards are arranged in a predetermined layout on a same screen; and a display section configured to display a video signal generated by the test pattern signal generation section, the standard for the first color gamut is a sRGB standard and the standard for the second color gamut is a xvYCC standard, in which a color chart of a test pattern for the xvYCC standard has a wider color range than that of the sRGB standard, and the test patterns are displayed in a matrix manner for each color on the same screen and include first, second and third regions, in which a color chart associated with the sRGB standard is displayed in the first region, a color chart associated with the xvYCC standard which is expanded in the positive direction of the sRGB standard is displayed in the second region, and a color chart associated with the xvYCC standard which is expanded in the negative direction of the sRGB standard is displayed in the third region.

6. A test pattern signal generator for outputting a video signal adapted to display, on a display device, a test pattern of a color chart, the test pattern signal generator comprising:

color chart recording means for recording color chart information of a standard for a first color gamut and color chart information of a standard for a second color gamut; and test pattern signal generation means for generating, based on the information recorded in the color chart recording means, a video signal adapted to display test patterns in which the color charts according to the respective standards are arranged in a predetermined layout on a same screen of the display device, the standard for the first color gamut is a sRGB standard and the standard for the second color gamut is a xvYCC standard, in which a color chart of a test pattern for the xvYCC standard has a wider color range than that of the sRGB standard, and the test patterns are displayed in a matrix manner for each color on the same screen of the display device and include first, second and third regions, in which a color chart associated with the sRGB standard is displayed in the first region, a color chart associated with the xvYCC standard which is expanded in the positive direction of the sRGB standard is displayed in the second region, and a color chart associated with the xvYCC standard which is expanded in the negative direction of the sRGB standard is displayed in the third region.

7. A color measurement system for generating a video signal adapted to display a test pattern of a color chart, displaying the generated video signal on a display device, and measuring displayed colors, the color measurement system comprising:

color chart recording means for recording color chart information of a standard for a first color gamut and color chart information of a standard for a second color gamut;

test pattern signal generation means for generating, based on the information recorded in the color chart recording means, a video signal adapted to display test patterns in which the color charts according to the respective standards are arranged in a predetermined layout on a same screen of the display device; and color measurement means for measuring a measurement data of a test pattern displayed on the display device based on the video signal generated by the test pattern signal generation means;

numeric conversion means for converting color measurement data into numeric data and analyzing the numeric data, the standard for the first color gamut is a sRGB standard and the standard for the second color gamut is a xvYCC standard, in which a color chart of a test pattern for the xvYCC standard has a wider color range than that of the sRGB standard, and the test patterns are displayed in a matrix manner for each color on the same screen of the display device and include first, second and third regions, in which a color chart associated with the sRGB standard is displayed in the first region, a color chart associated with the xvYCC standard which is expanded in the positive direction of the sRGB standard is displayed in the second region, and a color chart associated with the xvYCC standard which is expanded in the negative direction of the sRGB standard is displayed in the third region.

8. A display device for displaying a test pattern of a color chart, the display device comprising:

color chart recording means for recording color chart information of a standard for a first color gamut and color chart information of a standard for a second color gamut;

test pattern signal generation means for generating, based on the information recorded in the color chart recording means, a video signal adapted to display test patterns in which the color charts according to the respective standards are arranged in a predetermined layout on a same screen; and display means for displaying a video signal generated by the test pattern signal generation means, the standard for the first color gamut is a sRGB standard and the standard for the second color gamut is a xvYCC standard, in which a color chart of a test pattern for the xvYCC standard has a wider color range than that of the sRGB standard, and the test patterns are displayed in a matrix manner for each color on the same screen and include first, second and third regions, in which a color chart associated with the sRGB standard is displayed in the first region, a color chart associated with the xvYCC standard which is expanded in the positive direction of the sRGB standard is displayed in the second region, and a color chart associated with the xvYCC standard which is expanded in the negative direction of the sRGB standard is displayed in the third region.

9. The test pattern signal generator of claim 1, in which the first region is positioned between the second and third regions on the same screen of the display device.

* * * * *